US011681754B2

(12) United States Patent
Gupta et al.

(10) Patent No.: US 11,681,754 B2
(45) Date of Patent: Jun. 20, 2023

(54) TECHNOLOGIES FOR MANAGING CONNECTED DATA ON PERSISTENT MEMORY-BASED SYSTEMS

(71) Applicant: Intel Corporation, Santa Clara, CA (US)

(72) Inventors: Vishakha Gupta, Beaverton, OR (US); Alain Kagi, Portland, OR (US); Philip Lantz, Cornelius, OR (US); Subramanya Dulloor, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 32 days.

(21) Appl. No.: 17/134,306

(22) Filed: Dec. 26, 2020

(65) Prior Publication Data

US 2021/0117473 A1    Apr. 22, 2021

Related U.S. Application Data (63) Continuation of application No. 14/866,941, filed on Sep. 26, 2015, now abandoned.

(51) Int. Cl.
*G06F 16/90* (2019.01)
*G06F 16/901* (2019.01)
(Continued)

(52) U.S. Cl.
CPC .......... *G06F 16/90* (2019.01); *G06F 16/9024* (2019.01); *G06F 12/0871* (2013.01);
(Continued)

(58) Field of Classification Search
CPC . G06F 16/90; G06F 16/9024; G06F 16/24552
See application file for complete search history.

(56) References Cited

U.S. PATENT DOCUMENTS 8,180,804 B1 * 5/2012 Narayanan ........ G06F 16/24578
707/798
9,128,845 B2    9/2015 Chang et al.
(Continued)

OTHER PUBLICATIONS

Coburn et al., NV-Heaps: Making Persistent Objects Fast and Safe with Next-Generation, Non-Volatile Memories, ASPLOS'11, Mar. 5, 2011 [retrieved on Mar. 22, 2022], . Retrieved from the Internet:< https://dl.acm.org/doi/abs/10.1145/1961295.1950380 >. (Year: 2011).*
(Continued)

*Primary Examiner* — Kristopher Andersen
(74) *Attorney, Agent, or Firm* — Hanley, Flight & Zimmerman, LLC (57) ABSTRACT

Managing connected data, such as a graph data store, includes a computing device with persistent memory and volatile memory. The computing device stores a graph data store with a plurality of nodes and edges in persistent memory. Each of the edges defines the relationship between at least two of the nodes. The nodes and edges may contain tags and properties containing additional information. In response to a search request query, the computing device generates an iterator object stored in volatile memory with a reference to one or more nodes and/or edges in the graph data store. The split between volatile and persistent memory allocation could be used for other objects, such as allocators and transactions. Other embodiments are described and claimed.

26 Claims, 5 Drawing Sheets

(51) Int. Cl.
   *G06F 12/08* (2016.01)
   *G06F 12/0871* (2016.01)
   *G06F 12/0897* (2016.01)
(52) U.S. Cl.
   CPC .... *G06F 12/0897* (2013.01); *G06F 2212/163* (2013.01); *G06F 2212/214* (2013.01); *G06F 2212/466* (2013.01)

(56) References Cited

U.S. PATENT DOCUMENTS

| | | |
|---|---|---|
| 2012/0323970 A1 | 12/2012 | Larson et al. |
| 2016/0314220 A1 | 10/2016 | Sachdev et al. |
| 2017/0090807 A1 | 3/2017 | Gupta et al. |

OTHER PUBLICATIONS

United States Patent and Trademark Office, "Non-Final Office Action," issued in connection with U.S. Appl. No. 14/866,941, dated Mar. 13, 2019, 13 pages.

United States Patent and Trademark Office, "Final Office Action," issued in connection with U.S. Appl. No. 14/866,941, dated Sep. 10, 2019, 14 pages.

United States Patent and Trademark Office, "Non-Final Office Action," issued in connection with U.S. Appl. No. 14/866,941, dated Apr. 3, 2020, 14 pages.

United States Patent and Trademark Office, "Final Office Action," issued in connection with U.S. Appl. No. 14/866,941, dated Nov. 10, 2020, 14 pages.

\* cited by examiner

TECHNOLOGIES FOR MANAGING CONNECTED DATA ON PERSISTENT MEMORY-BASED SYSTEMS

RELATED APPLICATIONS

This patent arises from a continuation of U.S. patent application Ser. No. 14/866,941, filed Sep. 26, 2015. U.S. patent application Ser. No. 14/866,941 is hereby incorporated herein by reference in its entirety.

BACKGROUND

Queries for neighbors, friends-of-friends connections, paths between nodes or other interesting patterns have grown tremendously important on today's ever evolving datasets. Graph-based databases (or data stores) have the potential to bring the important ACID (Atomicity, Consistency, Isolation, Durability) properties associated with transactions to a data organization that treats relationships as a first-class concept. For example, unknown or non-obvious relationships between nodes can be identified.

New persistent memory technologies, such as memristors and phase change memory, offer a byte-addressable interface and memory access latencies that are comparable to those of volatile memory, such as dynamic random-access memory (DRAM). These persistent memory technologies may have a profound influence on organized data storage due to the availability of faster persistent storage and larger main memories. However, none of the existing graph-based databases support a completely in-memory database model.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
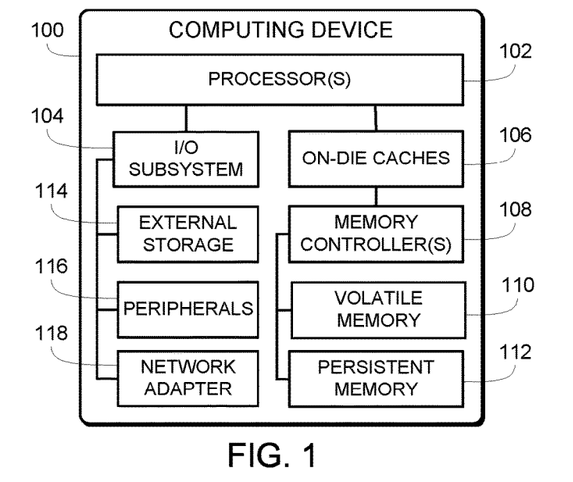
FIG. 1 is a simplified block diagram of at least one embodiment of a computing device for managing connected data.

Referring now to FIG. 1, an illustrative computing device 100 for managing connected data, such as a graph data store, includes at least one processor 102, an I/O subsystem 104, at least one on-die cache 106, and a memory controller 108 to control a volatile memory 110 and a persistent memory 112. In use, as described below, an entire graph data store is stored in the persistent memory 112. The graph data store includes a plurality of nodes and edges that define relationships between the nodes. In some embodiments, the nodes and/or edges each includes a unique identifier. The computing device 100 is configured to add, delete, and/or read nodes and/or edges (and other data) in the graph data store. The computing device 100 is also configured to generate an iterator object in response to a search request query. The iterator object includes pointers (or references) to nodes and/or edges in the graph data store that are responsive to the search request. The iterator object is stored in the volatile memory 110 and accesses the graph data store in the persistent memory based on the pointers of the iterator object. The terms "pointers" and "references" are broadly intended to encompass any reference to a value in memory.

The computing device 100 may be embodied as any type of device capable of performing the functions described herein. For example, the computing device 100 may be embodied as, without limitation, a computer, a workstation, a server computer, a laptop computer, a notebook computer, a tablet computer, a smartphone, a mobile computing device, a desktop computer, a distributed computing system, a multiprocessor system, a consumer electronic device, a smart appliance, and/or any other computing device capable of executing software code segments. As shown in FIG. 1, the illustrative computing device 100 includes the processor 102, the I/O subsystem 104, the on-die cache 106, and the memory controller 108 to control volatile memory 110 and persistent memory 112. Of course, the computing device 100 may include other or additional components, such as those commonly found in a workstation (e.g., various input/output devices), in other embodiments. For example, the computing device 100 may include an external storage 114, peripherals 116, and/or a network adapter 118. Additionally, in some embodiments, one or more of the illustrative components may be incorporated in, or otherwise form a portion of, another component. For example, the memory 110, 112 or portions thereof, may be incorporated in the processor 102 in some embodiments.

The processor 102 may be embodied as any type of processor capable of performing the functions described herein. For example, the processor may be embodied as a single or multi-core processor(s), digital signal processor, microcontroller, or other processor or processing/controlling circuit. The volatile memory 110 and persistent memory 112 may be embodied as any type of volatile memory and persistent memory, respectively, capable of performing the functions described herein. Volatile memory 110 contrasts with persistent memory 112 in that the persistent memory 112 does not lose content when power is lost. In operation, the volatile memory 110 and persistent member 112 may store various data and software used during operation of the computing device 100 such as operating systems, applications, programs, libraries, and drivers. The memory 110, 112 is communicatively coupled to the processor 102 via the memory bus using memory control(s) 108, which may be embodied as circuitry and/or components to facilitate input/output operations with the processor 102, the memory 110, 112, and other components of the computing device 100.

The I/O subsystem 104 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 104 may form a portion of a system-on-a-chip (SoC) and be incorporated, along with the processor 102, the memory 110, 112, and other components of the computing device 100, on a single integrated circuit chip.

An external storage device 114 may be coupled to the processor 102 with the I/O subsystem 104. The external storage device 114 may be embodied as any type of device or devices configured for short-term or long-term storage of data such as, for example, memory devices and circuits, memory cards, hard disk drives, solid-state drives, or other data storage devices. Unlike existing systems, however, one or more embodiments contemplate that computing device 100 would not include any external storage 114 and that a graph database and all other data needed by computing device 100 would be stored on the persistent memory 112 on the memory bus instead of the external storage 114.

The computing device 100 may also include peripherals 116. The peripherals 116 may include any number of additional input/output devices, interface devices, and/or other peripheral devices. By way of example only, the peripheral 116 may include a display that could be embodied as any type of display capable of displaying digital information such as a liquid crystal display (LCD), a light emitting diode (LED), a plasma display, a cathode ray tube (CRT), or other type of display device.

The computing device 100 illustratively includes a network adapter 118, which may be embodied as any communication circuit, device, or collection thereof, capable of enabling communications between the computing device 100 and other remote devices over a computer network (not shown). The network adapter 118 may be configured to use any one or more communication technology (e.g., wired or wireless communications) and associated protocols (e.g., Ethernet, Bluetooth®, Wi-Fi®, WiMAX, etc.) to effect such communication.

Figure 2:
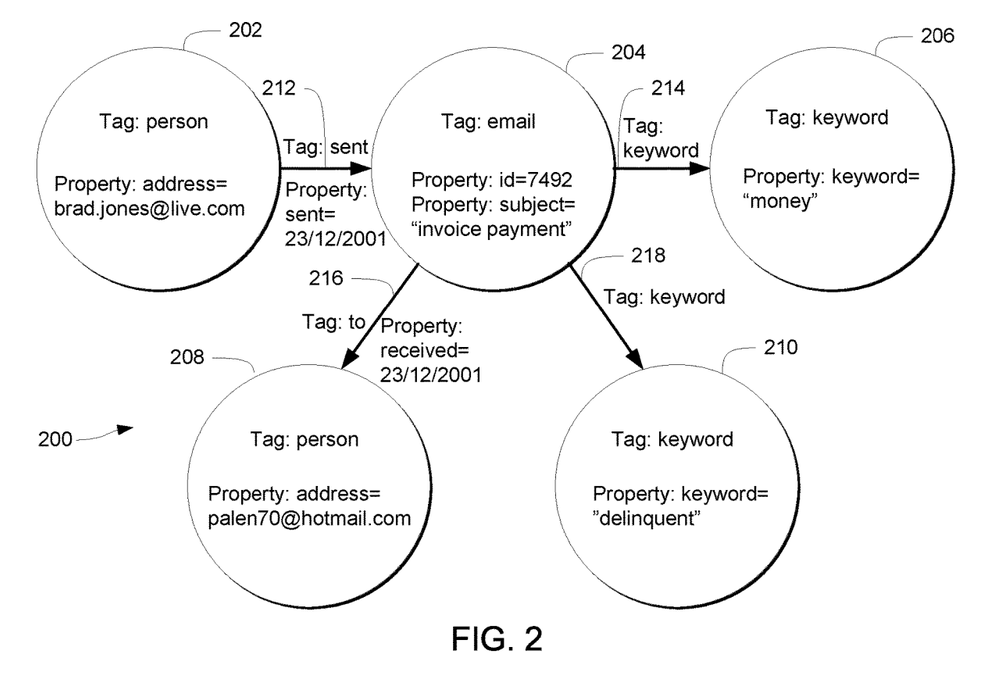
FIGS. 2 and 3 are a simplified block diagrams of an illustrative graph data store that may be generated and/or managed by the computing device of FIG. 1.

Referring to FIG. 2, an illustrative embodiment is shown with an example graph data store 200, which may be stored in persistent memory 112. The graph data store 200 includes a plurality of nodes (also called vertices) that are connected with a plurality of edges that establish relationships between the nodes. The graph data store 200 is shown for purposes of example only. Although the graph data store 200 shown includes five nodes and four edges for purposes of example, one skilled in the art should understand that more or less nodes and/or edges could be used depending on the data set. In some circumstances, for example, millions of nodes and/or edges (or more) could be provided in a graph data store.

As shown, the example graph data store 200 includes a first node 202, a second node 204, a third node 206, a fourth node 208, and a fifth node 210 and a first edge 212, a second edge 214, a third edge 216, and a fourth edge 218. Each node and edge of the graph data store 200 has an associated tag that can be used for classification. For example, the classification could identify entity types, document types, or other attribute types of a node and/or edge. In the example shown, the first and fourth nodes 202, 208 are associated with the tag "person," the second node 204 with the tag "email," and the third and fifth nodes 206, 210 with the tag "keyword." Likewise, the first edge 212 is associated with the tag "sent," the second and fourth edges 214, 218 with the tag "keyword," and the third edge 208 with the tag "person." In cases where usage does not require a tag, a default tag could be used. In some embodiments, the tag may be a short string.

In addition to and distinct from tags, one or more properties may be associated with the nodes and/or edges of the graph data store 200. A property is illustratively embodied as a key-value pair, in which the key is a short string and the value is one of a plurality of pre-defined types. By way of example only, the predefined property types may include Booleans, integers, floats, strings, times, and/or blobs (i.e., arbitrary strings of bits). In some embodiments, all predefined types, with the exception of blobs, are orderable. In the example shown, the first node 202 is associated with the property key "address" and has a value of "brad.jones@live.com." As shown, the second node 204 is associated with two properties. The first property has a key of "id" and a value of "7482" and a second property key of "subject" and a value of "invoice payment." Likewise, the edges of the graph data store 200 may include one or more properties. For example, the first edge 212 includes a property key of "sent" and a value of "23/12/2001." By way of another example, the third edge 216 includes the property key "received" and a value of "23/12/2001."

Figure 3:
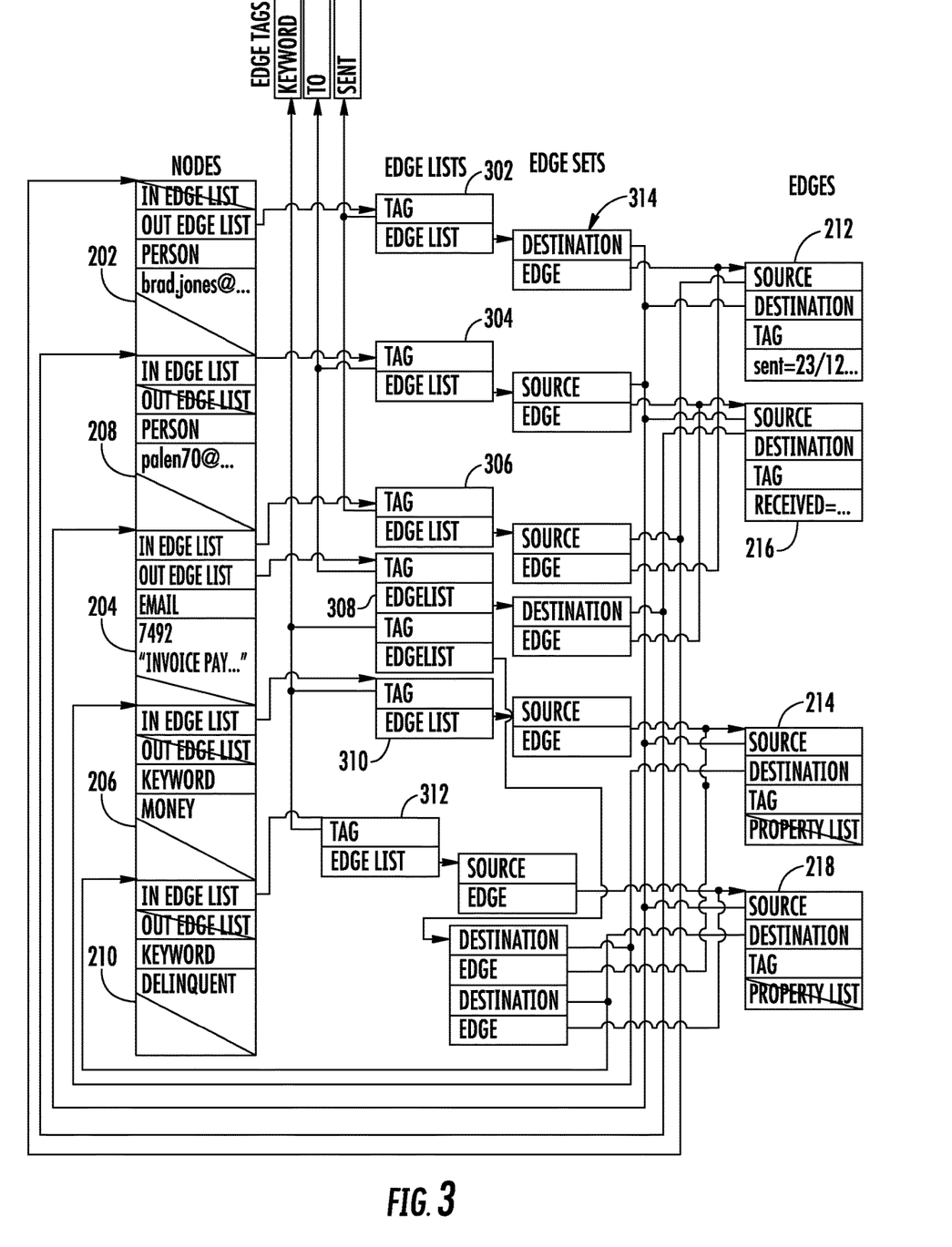

FIG. 3 illustratively shows an example layout of the graph data store 200 in persistent memory 112. In this example, the tags and properties associated with nodes 202, 204, 206, 208 are stored in node objects within the node table. The nodes 202, 204, 206, 208 include an in and/or out edge list that points to an edge list 300; however, in some embodiments, the edges could be undirected. As shown, for example, node 202 includes an out edge list pointer to an edge list 302 associated with edge 212. By way of another example, node 208 includes an in edge list pointer to an edge list 304 associated with 216. As shown, node 204 includes both an in edge list pointer and an out edge list pointer. The in edge list pointer points to an edge list 306 associated with edge 212. The out edge list point points to an edge list 308 associated with edge 216. Node 206, in the example shown, includes an in edge list pointer that points to an edge list 310 associated with edge 214. Additionally, node 210 includes an in edge list pointer that points to an edge list 312 associated with edge 218. The edge lists 302, 304, 306, 308, 310, 312 include pointers to edge tags. In the example shown, edge lists 310, 312 include a pointer to edge tag "keyword." Edge lists 304, 308 include pointers to edge tag "to." Additionally, edge lists 302, 306 include pointers to the edge tag "sent." In some embodiments, an intermediate data structure could be used called a tag-sorted edgeset 314 to speed up neighbor lookups in particular and graph traversal in general. Tag-sorted edgesets collate edge information with identical tags to allow efficient iteration over related edges. In addition, the edge-sets may contain source/destination node information to allow efficient accessing of neighbor nodes.

Figure 4:
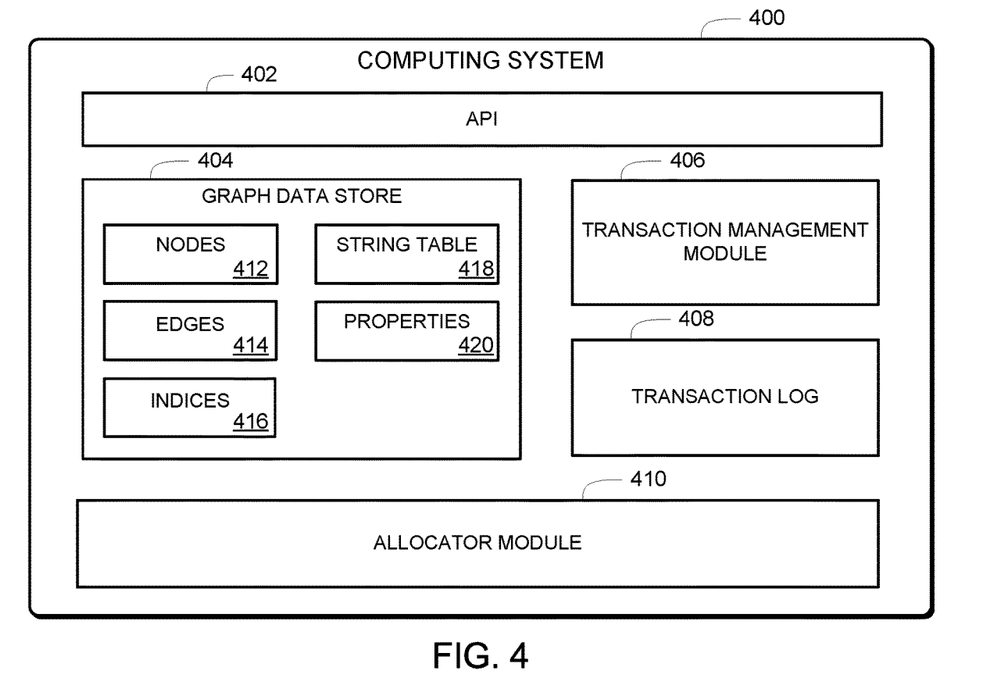
FIG. 4 is a simplified block diagram of at least one embodiment of an environment of the computing device of FIG. 1.

Referring now to FIG. 4, in the illustrative embodiment, the computing device 100 establishes an environment 400 during operation. The illustrative environment 400 includes an API 402, a graph data store 404, a transaction management module 406, a transaction log 408, and an allocator module 410. The graph data store 404 illustratively includes a plurality of nodes 412, a plurality of edges 414, tag-based and/or property-based indices 416, a string table 418, and a plurality of properties 420 associated with the nodes 412 and/or edges 414. The various modules of the environment 400 may be embodied as hardware, firmware, software, or a combination thereof. As such, in some embodiments, one or more of the modules of the environment 400 may be embodied as circuitry or collection of electrical devices (e.g., transaction management circuitry 406 and/or allocator circuitry 410). It should be appreciated that, in such embodiments, one or more of the transaction management circuitry 406 and/or the allocator circuitry 410 may form a portion of one or more of the processor 102, the I/O subsystem 104, the memory 110, 112, the external storage 114, the network adapter 118, and/or other components of the computing device 100. Additionally, in some embodiments, one or more of the illustrative modules may form a portion of another module and/or one or more of the illustrative modules may be independent of one another.

As shown, the environment 400 includes an API 402 through which programs may interact with the graph data store 404. For example, the API 402 may be used as an interface by a program to add (or create), read, remove (delete) and/or modify the nodes 412, edges 414, indices 416, string table 418 and/or properties 420 of the graph data store 400. The transaction management module 406 manages transactions with the graph data store 400 and updates the transaction log 408 so that the state of the data store is consistent at transaction boundaries and can be recovered if a failure occurs within a transaction.

The allocator module 410 is configured to manage allocations or partitions in the persistent memory 112 for the various entities (e.g., nodes, edges, properties). The allocator module 410 chooses the data structure sizes and layout to be cache-efficient, organizes data and logs to be streaming and prefetch friendly, and avoids unnecessary writes to persistent memory 112 because the write bandwidth is lower than that of volatile memory 110. In some embodiments, the allocator module 410 stores nodes 408 and edges 410 in one or more tables with fixed-size objects. To maximize storage utilization inside each node or edge element, the properties of these entities are stored inline in a best-fit manner. For example, the properties of entities could be stored in-line to maximize storage. For properties that exceed the amount of space available within a node or edge object, the allocator module 410 allocates separate chunks that are also filled in a best-fit manner. Despite the space-efficient layout, these properties are accessible directly, without the need to "deserialize" them into an accessible format, as is the case with other compact data storage options or disk-based storage options.

Based on current projections, the persistent memory 112 will be slower than volatile memory 110 for read and write, and will have limited durability, meaning the probability of failure increases after some large number of writes. In one embodiment, the data structures, such as iterator objects, allocator objects, and transaction objects, can be split between volatile memory 110 and persistent memory 112 to optimize wear and access times. For example, the allocator module 410 could include statistics and the actual persistent memory areas that it manages. Since the statistics are updated quite frequently with each allocation/de-allocation and also since they are primarily used internally rather than part of the user data, this data can be stored in volatile memory 110 and perhaps a checkpoint to this data in the allocator header could be stored in persistent memory 112 if required.

Figure 5:
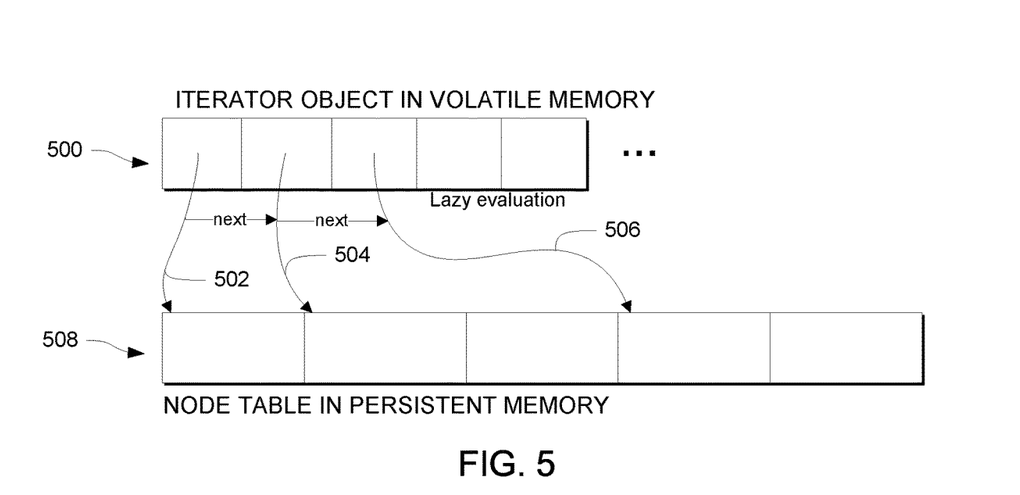
FIG. 5 is a simplified flow diagram of at least one embodiment in which an interactor object includes pointers to a graph data store.

In some embodiments, the API 402 provides an interface through which the graph data store 404 can be searched. In the illustrative embodiment, the API 402 is configured to return an iterator object in response to a search request on the graph data store 404. An illustrative iterator object 500 is shown in FIG. 5. The iterator object 500 includes a reference to data in the graph data store 404. For example, the iterator object 500 could include a first pointer 502 that points to the first node in the graph data store 404 that matches the search query. If the user requests additional data that satisfies the query, the API 402 could be used to advance the iterator object 500 to the next node matching the query. As shown, a second pointer 504 illustrates the iterator object 500 having been advanced by the API 402 to the next pointer, which points to the next node matching the query. A third pointer 506 illustrates the iterator object 500 having been advanced, yet again, to the next node matching the query. This process would continue with the iterator object 500 advancing to the next pointer as the user requests additional matches in the graph data store 404 using the API 402. The iterator object 500 is stored in volatile memory 110 and maintains its volatile state, such as the next pointer, for speed of access, but points to the actual graph data (such as nodes or properties) of the graph data store 404 in persistent memory 112, which is accessed as the iterator object 500 progresses. Although FIG. 5 illustratively shows pointers 502 of the iterator object 500 pointing to data in a node table

508, the pointers could point to any data in the graph data store 404 in other embodiments. As shown, a program searching the graph data store 404 through the API 402, will be returned an iterator object 500 that can be examined by the program one element at a time (next pointer to next pointer). In that sense, the queries are evaluated lazily and follow the "next" pointers only when requested by the user causing a data fetch. Since the entire graph data store 404 is stored in directly-accessible persistent memory 112, serializing and de-serializing data can be avoided, unlike existing graph stores, which use disks for making data persistent, and managed languages that do not provide a way to access data from buffer caches without creating temporary objects that reside in memory.

Figure 6:
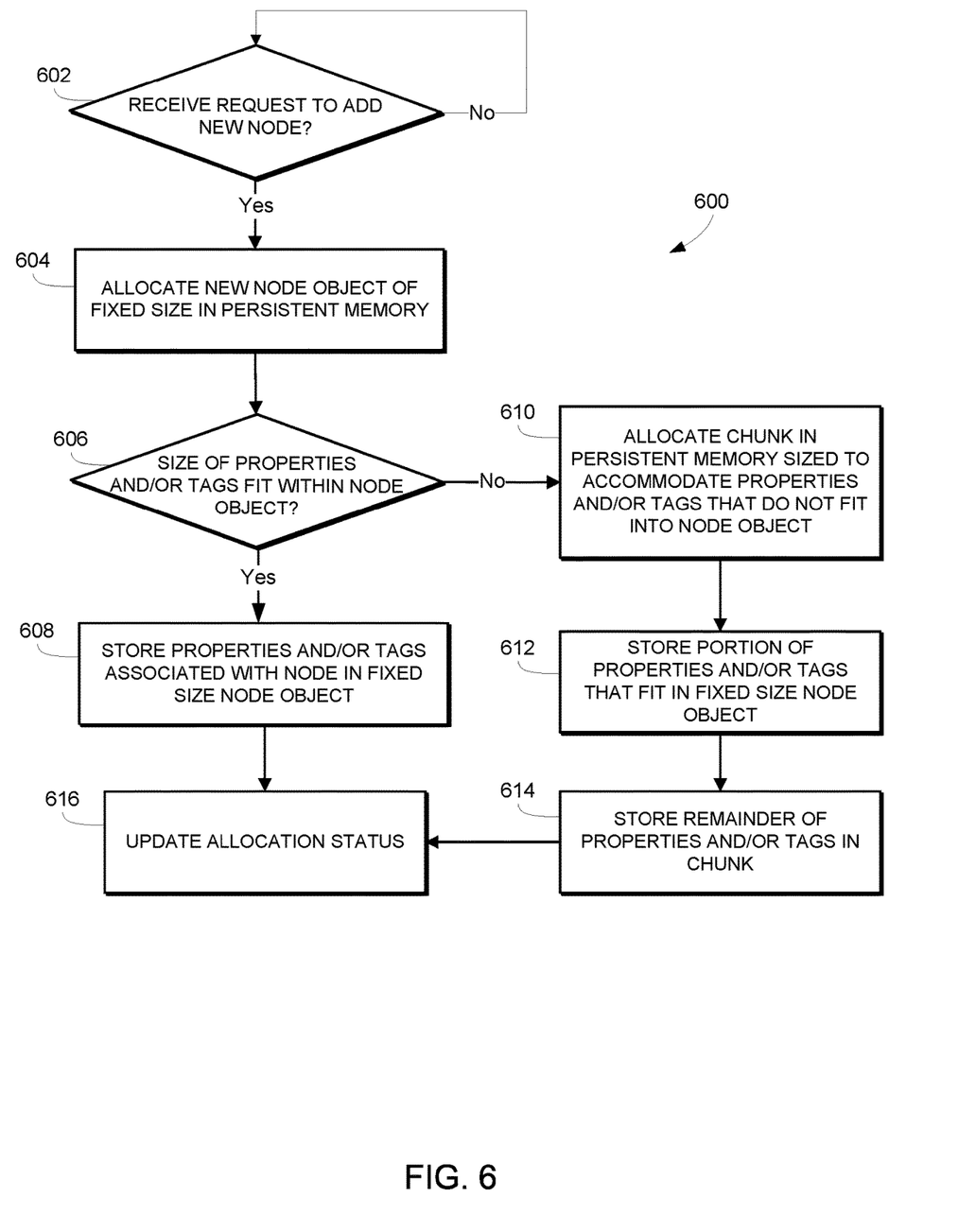
FIG. 6 is a simplified flow diagram of at least one embodiment of a method for generating and/or modifying a graph data store that may be executed by the computing device of FIGS. 1 and 4.

Referring now to FIG. 6, in use, the computing device 100 may execute a method 600 to create a new entity, such as a node and/or edge in the graph data store 404. Although the method 600 is directed to the creation of a new node, the method 600 may also be used to create, delete and/or update other entities in the graph data store 404. In the example shown, the node being created is associated with properties; however, nodes and edges need not necessarily be associated with properties and/or tags. In the example embodiment shown, the method 600 begins with block 602 in which the computing device 100 determines whether a request has been received, such as through the API 402, to create a new node. If a new request is received, the method 600 advances to block 604 in which the computing device 100 creates a new node object of a fixed size in persistent memory 112. Subsequently, in block 606, the computing device 100 evaluates the size of the properties and/or tags (and any other data) associated with the new node to determine whether this data will fit within the fixed size of the node object. If the size of the properties and/or tags associated with the new node will fit within the new node object, the method 600 advances to block 608 in which the properties and/or tags are stored within the new node object. Alternatively, if the size of the properties and/or tags associated with the new node exceeds the size of the node object, the method 600 advances to block 610 in which the computing device 100 allocates a chunk in persistent memory. Subsequently, in block 612, the computing device 100 stores the portions of the properties and/or tags that will fit in the fixed sized node object. Additionally, in block 614, the computing device 100 stores the remainder of properties and/or tags in the allocated chunk of persistent memory. The method 600 will next advance to block 616 in which the allocation status is updated since the operation was completed successfully. This is consistent with ACID principles since a failure would not result in inconsistent data, but would be reverted without an update to the allocation status.

Figure 7:
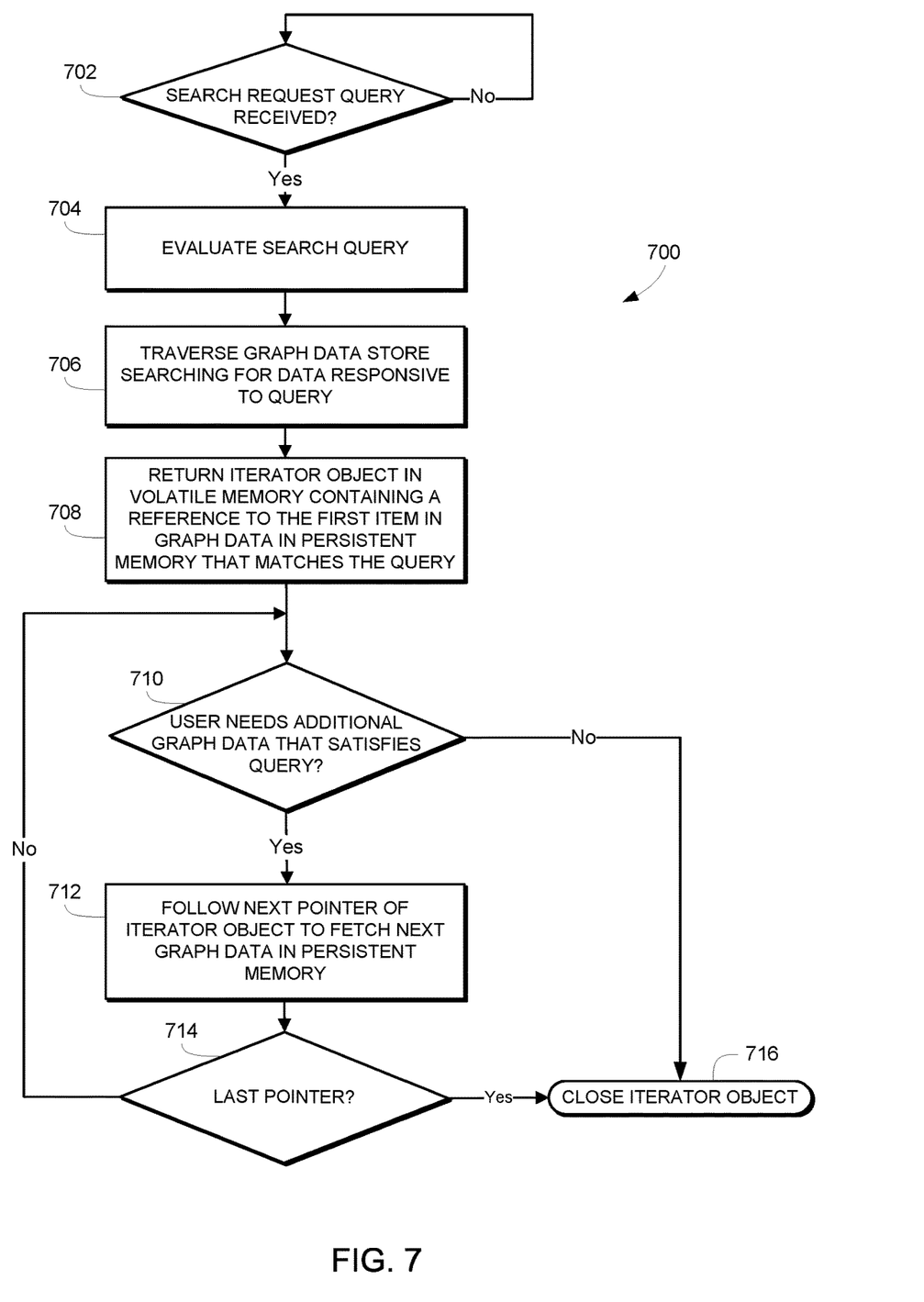
FIG. 7 is a simplified flow diagram of at least one embodiment of a method for responding to a search request that may be executed by the computer system of FIGS. 1 and 4.

Referring now to FIG. 7, in use, the computing device 100 may also execute a method 700 for performing a search on the graph data store 404. The method 700 begins with block 702 in which the computing device 100 determines whether a search query has been received. The search query may be received via the API 402 from a requesting computing device, service, program, and/or other source. If a search request query has been received, the method 700 advances to block 704 in which the computing device 100 evaluates the search query. For example, the computing device 100 may parse the search query to prepare for searching of the graph data store 404. Subsequently, in block 706, the computing device 100 traverses the graph data store 404 to find data responsive to the search query. In block 708, in response to locating data responsive to the search query, the computing device 100 generates and returns an iterator object stored in volatile memory 110 that includes a reference to the first item in the graph data store 404 in persistent memory 112 that matches the query. As such, in block 710, the computing device 100 may receive a user request for additional graph data that matches the query. If the user requests this additional graph data, the method 700 advances to block 712 in which the computing device 100 fetches the graph data associated with the next reference in the iterator object. Subsequently, in block 714, the computing device 100 determines whether the last data responsive to the query has been reached. If not, the method loops back to block 710 in which the computing device 100 determines whether another user request for graph data associated with the next pointer in the iterator object has been received. If, however, the last data responsive to the query has been reached, the method 700 advances to block 716.

It should be appreciated that, in some embodiments, any one or more of the methods described herein may be embodied as various instructions stored on a computer-readable media, which may be executed by the processor 102, a peripheral device 116, and/or other components of the computing device 100 to cause the computing device 100 to perform the corresponding method. The computer-readable media may be embodied as any type of media capable of being read by the computing device 100 including, but not limited to, the memory 110, 112, the external storage 114, a local memory or cache 106 of the processor 102, other memory or data storage devices of the computing device 100, portable media readable by a peripheral device 116 of the computing device 100, and/or other media.

EXAMPLES

Illustrative examples of the technologies disclosed herein are provided below. An embodiment of the technologies may include any one or more, and any combination of, the examples described below.

Example 1 includes computing device comprising at least one processor; at least one memory controller to access a volatile memory device and a persistent memory device on a memory bus, the persistent memory device having stored therein a graph data store including a plurality of nodes relationally arranged with a plurality of edges, each of the plurality of edges defining a relationship between at least two of the plurality of nodes, the volatile memory device having stored therein a plurality of instructions that, when executed by the processor, causes the processor to in response to an operation on the graph data store, partition data between the volatile memory device and the persistent memory device to minimize writes on the persistent memory device.

Example 2 includes the subject matter of Example 1, and wherein at least a portion of the nodes are associated with at least one tag representing a classification of the node.

Example 3 includes the subject matter of any of Example 1 or 2, and wherein at least a portion of the edges are associated with at least one tag representing a classification of the edge.

Example 4 includes the subject matter of any of Examples 1-3, and wherein the graph data store includes a tag sorted edge set to collate edges and associated nodes with identical tags.

Example 5 includes the subject matter of any of Examples 1-4, and wherein at least a portion of the nodes are associated with at least one property in the form of a key-value pair.

Example 6 includes the subject matter of any of Examples 1-5, and wherein at least a portion of the edges are associated with at least one property in the form of a key-value pair.

Example 7 includes the subject matter of any of Examples 1-6, and wherein the plurality of instructions further cause the processor to organize the nodes and/or edges of the graph data store in the persistent memory device as fixed size objects.

Example 8 includes the subject matter of any of Examples 1-7, and wherein the plurality of instructions further cause the processor to store at least one property and/or tag associated with a node and/or edge in-line in the fixed-size object representing the node and/or edge.

Example 9 includes the subject matter of any of Examples 1-8, and wherein the plurality of instructions further cause the processor to allocate, in response to the property and/or tag associated with the node and/or edge exceeding the size of the fixed-size object, a chunk of the persistent memory device separate from the fixed-size object.

Example 10 includes the subject matter of any of Examples 1-9, and wherein the plurality of instructions further cause the processor, in response to a search request query, to generate an iterator object stored on the volatile memory device that includes a reference to one or more nodes and/or edges in the graph data store on the persistent memory device.

Example 11 includes the subject matter of any of Examples 1-10, and wherein the plurality of instructions further cause the processor to advance the iterator object to directly access nodes and/or edges of the graph data store in response to a request for an additional match to the search query.

Example 12 includes the subject matter of any of Examples 1-11, and wherein the processor stores an allocator on the volatile memory device, the allocator comprising one or more memory addresses of the graph data store in the persistent memory device.

Example 13 includes the subject matter of any of Examples 1-12, and wherein the processor stores a portion of a transaction object on volatile memory and a portion of the transaction object on persistent memory such that writes to persistent memory are minimized while still maintaining the atomicity, consistency, isolation, durability ("ACID") properties of the graph data store.

Example 14 includes a method for managing a graph data store on a persistent memory device. The method includes storing, on a persistent memory device, a graph data store comprising a plurality of nodes and a plurality of edges, each of the plurality of edges defining a relationship between at least two of the plurality of nodes; managing a operation on the graph data store by storing a first portion of resulting data on a volatile memory device and a second portion of the resulting data on the persistent memory device to minimize writes on the persistent memory device.

Example 15 includes the subject matter of Example 14, further including allocating, by a computing device, a fixed size object on a persistent memory device to each of the plurality of nodes and edges.

Example 16 includes the subject matter of any of Example 14 or 15, and further including evaluating, by a computing device, a search request query on the graph data store; and generating, by a computing device, an iterator object including a reference to one or more nodes and/or edges in the graph data store in response to the search request query, wherein the iterator object is stored on a volatile memory device Example 17 includes the subject matter of any of Examples 14-16, and wherein the computing device manages the operation by partitioning the first portion and the second portion of resulting data to minimize writes to the persistent memory device.

Example 18 includes the subject matter of any of Examples 14-17, and further including storing at least one property and/or tag associated with a node and/or edge in-line in a fixed-size object.

Example 19 includes the subject matter of any of Examples 14-18, and wherein responsive to the property and/or tag associated with the node and/or edge exceeding the size of the fixed-size object, allocating a chunk of the persistent memory device separate from the fixed-size object.

Example 20 includes the subject matter of any of Examples 14-19, and wherein responsive to a search request query on the graph data store, further comprising storing an iterator that is an output to the search request query in a volatile memory device, the iterator including a reference to one or more nodes and/or edges in the graph data store on the persistent memory device.

Example 21 includes the subject matter of any of Examples 14-20, and further including advancing the iterator to directly access nodes and/or edges of the graph data store in response to a request for an additional match to the search query.

Example 22 includes the subject matter of any of Examples 14-21, and wherein at least a portion of the nodes are associated with at least one tag representing a classification of the node.

Example 23 includes the subject matter of any of Examples 14-22, and wherein at least a portion of the edges are associated with at least one tag representing a classification of the edge.

Example 24 includes the subject matter of any of Examples 14-23, and wherein the graph data store includes a tag sorted edge set to collate edges with identical tags to allow efficient iteration over related edges.

Example 25 includes the subject matter of any of Examples 14-24, and, wherein at least a portion of the nodes are associated with at least one property in the form of a key-value pair.

Example 26 includes the subject matter of any of Examples 14-25, and wherein at least a portion of the edges are associated with at least one property in the form of a key-value pair.

Example 27 includes one or more machine readable storage media comprising a plurality of instructions stored thereon that in response to being executed result in a computing device performing the method of any of Examples 14-26.

Example 28 includes a computing device comprising means for storing, on a persistent memory device, a graph data store comprising a plurality of nodes and a plurality of edges, each of the plurality of edges defining a relationship between at least two of the plurality of nodes; and means for managing a operation on the graph data store by storing a first portion of resulting data on a volatile memory device and a second portion of the resulting data on the persistent memory device to minimize writes on the persistent memory device.

Example 29 includes the subject matter of Example 28, and further including means for allocating a fixed size object on a persistent memory device to each of the plurality of nodes and edges.

Example 30 includes the subject matter of Examples 28 or 29, and further including means for evaluating a search request query on the graph data store; and means for generating an iterator object including a reference to one or more nodes and/or edges in the graph data store in response to the search request query, wherein the iterator object is stored on a volatile memory device Example 31 includes the subject matter of any of Examples 28-30, and further including means for managing the operation by partitioning the first portion and the second portion of resulting data to minimize writes to the persistent memory device.

Example 32 includes the subject matter of any of Examples 28-31, and further including means for storing at least one property and/or tag associated with a node and/or edge in-line in a fixed-size object.

Example 33 includes the subject matter of any of Examples 28-32, and further including means for allocating, responsive to the property and/or tag associated with the node and/or edge exceeding the size of the fixed-size object, a chunk of the persistent memory device separate from the fixed-size object.

Example 34 includes the subject matter of any of Examples 28-33, and further including means for storing, responsive to a search request query on the graph data store, an iterator that is an output to the search request query in a volatile memory device, the iterator including a reference to one or more nodes and/or edges in the graph data store on the persistent memory device.

Example 35 includes the subject matter of any of Examples 28-34, and further including means for advancing the iterator to directly access nodes and/or edges of the graph data store in response to a request for an additional match to the search query.

Example 36 includes the subject matter of any of Examples 28-35, and wherein at least a portion of the nodes are associated with at least one tag representing a classification of the node.

Example 37 includes the subject matter of any of Examples 28-36, and wherein at least a portion of the edges are associated with at least one tag representing a classification of the edge.

Example 38 includes the subject matter of any of Examples 28-37, and wherein the graph data store includes a tag sorted edge set to collate edges with identical tags to allow efficient iteration over related edges.

Example 39 includes the subject matter of any of Examples 28-38, and wherein at least a portion of the nodes are associated with at least one property in the form of a key-value pair.

Example 40 includes the subject matter of any of Examples 28-39, and wherein at least a portion of the edges are associated with at least one property in the form of a key-value pair.

What is claimed is:

1. At least one storage device comprising instructions that when executed by one or more processors of a computing device cause the one or more processors to at least:
   cause storage of a database within a persistent memory of the computing device, wherein the persistent memory is byte-addressable;
   cause storage of a workload in data rows of the database in the persistent memory, wherein the persistent memory is on a memory bus that is shared with a volatile memory, wherein the persistent memory retains content of the persistent memory when power to the persistent memory is removed, wherein the workload includes storage of a plurality of nodes in the database, a first node of the plurality of nodes associated with a first identifier to indicate a type of the first node, wherein the workload includes storage of a plurality of edges to define relationships among the plurality of nodes in the database, a first edge of the plurality of edges associated with a second identifier to indicate a type of relationship of the first edge, and wherein each of the first node and the first edge are associated with a property represented as a key-value pair;
   access the data rows of the database in the persistent memory;
   create a first object in the volatile memory that includes first addresses of first ones of the data pages rows in the database in the persistent memory; and
   create a second object in the persistent memory for a write operation to modify the workload in the database in the persistent memory.

2. The at least one storage device of claim 1, wherein the persistent memory is non-volatile memory controlled by a memory controller coupled to the memory bus.

3. The at least one storage device of claim 1, wherein each of the plurality of edges and the plurality of nodes are associated with a plurality of identifiers, ones of the plurality of identifiers to classify respective edges and respective nodes.

4. The at least one storage device of claim 1, further including instructions that when executed by one or more processors of a computing device cause the one or more processors to at least:
   in response to a search request query, generate an iterator object stored on the volatile memory that includes a reference to one or more edges in the workload on the persistent memory.

5. The at least one storage device of claim 1, further including instructions that when executed by one or more processors of a computing device cause the one or more processors to at least:
   in response to a search request query, generate an iterator object stored on the volatile memory that includes a reference to one or more nodes in the workload on the persistent memory.

6. The at least one storage device of claim 5, further including instructions that when executed by one or more processors of a computing device cause the one or more processors to at least:
   store a portion of a transaction object on volatile memory and a portion of the transaction object on persistent memory to minimize writes to persistent memory while maintaining the atomicity, consistency, isolation, and durability (ACID) properties of the workload.

7. The at least one storage device of claim 5, further including instructions that when executed by one or more processors of a computing device cause the one or more processors to at least:
   iterate, using a pointer in volatile memory, through the objects in the persistent memory to satisfy a query, the persistent memory implemented by a graph data store.

8. At least one non-transitory computer-readable storage medium comprising instructions which, when executed, cause a processor to at least:
   cause storage of a database within a persistent memory of the at least one non-transitory computer-readable storage medium, wherein the persistent memory is byte-addressable;
   cause storage of a workload in data rows of the database in the persistent memory, wherein the persistent memory is on a memory bus that is shared with a volatile memory, wherein the persistent memory retains content of the persistent memory when power to the persistent memory is removed, wherein the workload includes storage of a plurality of nodes in the database, a first node of the plurality of nodes to be associated with an identifier that indicates a type of node of the first node, wherein the workload includes storage of a plurality of edges to define relationships among the plurality of nodes in the database, a first edge of the plurality of edges to be associated with another identifier that indicates a type of relationship of the first edge, and wherein at least one of the first node or the first edge is associated with a property represented as key-value pair;
  access the data rows of the database in the persistent memory using addresses of the data rows to bypass an input-output stack;
  create a first object in the volatile memory that includes addresses of the data rows in the database in the persistent memory; and
  create a second object in the persistent memory for a write operation to modify the workload in the database in the persistent memory.

9. The at least one non-transitory computer-readable storage medium of claim 8, wherein the persistent memory is non-volatile memory controlled by a memory controller coupled to the memory bus.

10. The at least one non-transitory computer-readable storage medium of claim 8, wherein the plurality of edges and the plurality of nodes are associated with a plurality of the identifiers to classify ones of the plurality of edges and ones of the plurality of nodes.

11. The at least one non-transitory computer-readable storage medium of claim 8, further including instructions that when executed cause the processor to at least:
  in response to a search request query, generate an iterator object stored on the volatile memory that includes a reference to one or more edges in the workload on the persistent memory.

12. The at least one non-transitory computer-readable storage medium of claim 8, further including instructions that when executed cause the processor to at least:
  in response to a search request query, generate an iterator object stored on the volatile memory that includes a reference to one or more nodes in the workload on the persistent memory.

13. The at least one non-transitory computer-readable storage medium of claim 12, further including instructions that when executed cause the processor to at least:
  store a portion of a transaction object on volatile memory and a portion of the transaction object on persistent memory to minimize writes to persistent memory while maintaining the atomicity, consistency, isolation, and durability (ACID) properties of the workload.

14. The at least one non-transitory computer-readable storage medium of claim 12, further including instructions that when executed cause the processor to at least:
  iterate, using a pointer in volatile memory, through the objects in the persistent memory to satisfy a query, the persistent memory implemented by a graph data store.

15. An apparatus to determine a graph data store of a plurality of vertices that are connected to a plurality of edges, the apparatus comprising:
  persistent memory, wherein the persistent memory is byte-addressable;
  machine readable instructions;
  at least one logic circuit to execute the machine readable instructions to at least:
    cause storage of a database within the persistent memory;
    cause storage of a workload in data rows of the database in the persistent memory, wherein the persistent memory is on a memory bus that is shared with a volatile memory, wherein the persistent memory retains content of the persistent memory when power to the persistent memory is removed, wherein the workload includes storage of a plurality of nodes in the database, at least one node of the plurality of nodes to be associated with a first identifier to indicate a type of the at least one node, wherein the workload includes storage of a plurality of edges to define relationships among the plurality of nodes in the database, at least one edge of the plurality of edges to be associated with second identifier to indicate a type of the relationships, and wherein the at least one node and the at least one edge are associated with a property represented by a key and a value;
    access the data rows of the database in the persistent memory;
    create a first object in the volatile memory that includes addresses of the data rows in the database in the persistent memory; and
    create a second object in the persistent memory for a write operation to modify the workload in the database in the persistent memory.

16. The apparatus of claim 15, wherein the persistent memory is non-volatile memory controlled by a memory controller coupled to the memory bus.

17. The apparatus of claim 15, wherein the plurality of edges and the plurality of nodes are associated with a plurality of identifiers and a plurality of properties.

18. The apparatus of claim 15, wherein the at least one logic circuit is further to execute machine readable instructions to:
  in response to a search request query, generate an iterator object stored on the volatile memory that includes a reference to one or more edges in the workload on the persistent memory.

19. The apparatus of claim 15, wherein the at least one logic circuit is further to execute machine readable instructions to:
  in response to a search request query, generate an iterator object stored on the volatile memory that includes a reference to one or more nodes in the workload on the persistent memory.

20. The apparatus of claim 19, wherein the at least one logic circuit is further to execute machine readable instructions to:
  store a portion of a transaction object on volatile memory and a portion of the transaction object on persistent memory to minimize writes to persistent memory while maintaining the atomicity, consistency, isolation, and durability (ACID) properties of the workload.

21. The apparatus of claim 19, wherein the at least one logic circuit is further to execute machine readable instructions to:
  iterate, using a pointer in volatile memory, through the objects in the persistent memory of the graph data store to satisfy a query.

22. A computer system comprising:
  a display;
  at least one storage device;

at least one network communication device;
at least one user input device;
at least one processor to execute instructions to cause the at least one processor to:
cause storage of a database within a persistent memory of the at least one storage device, wherein the persistent memory is byte-addressable;
cause storage of a workload in data rows of the database in the persistent memory, wherein the persistent memory is on a memory bus that is shared with a volatile memory, wherein the persistent memory retains content of the persistent memory when power to the persistent memory is removed, wherein the workload includes storage of a plurality of nodes in the database, a first node of the plurality of nodes associated with a first tag to indicate a type of the first node, wherein the workload includes storage of a plurality of edges to define relationships among the plurality of nodes in the database, a first edge of the plurality of edges associated with a second tag to indicate a type of relationship of the first edge, and wherein each of the first node and the first edge are associated with a property that includes a key associated with a value;
access the data rows of the database in the persistent memory;
create first object in the volatile memory that includes addresses of the data rows in the database in the persistent memory; and
create a second object in the persistent memory for a write operation to modify the workload in the database in the persistent memory.

23. The computer system of claim 22, wherein the persistent memory is non-volatile memory controlled by a memory controller coupled to the memory bus.

24. The computer system of claim 22, wherein the plurality of nodes is associated with a plurality of identifiers and a plurality of properties.

25. The computer system of claim 22, further including instructions that when executed by the at least one processor cause the at least one processor to at least:
in response to a search request query, generate an iterator object stored on the volatile memory that includes a reference to one or more edges in the workload on the persistent memory.

26. The computer system of claim 22, further including instructions that when executed by the at least one processor cause the at least one processor to at least:
in response to a search request query, generate an iterator object stored on the volatile memory that includes a reference to one or more nodes in the workload on the persistent memory.

* * * * *